US010036476B2

(12) United States Patent
Yamamoto et al.

(10) Patent No.: US 10,036,476 B2
(45) Date of Patent: Jul. 31, 2018

(54) OPENING AND CLOSING VALVE

(71) Applicant: FUMOTO GIKEN CO., LTD., Miura-gun, Kanagawa (JP)

(72) Inventors: Ryohei Yamamoto, Miura-gun (JP); Yuho Yamamoto, Miura-gun (JP); Naoyuki Yamamoto, Miura-gun (JP)

(73) Assignee: FUMOTO GIKEN CO., LTD., Miura-gun (JP)

( * ) Notice: Subject to any disclaimer, the term of this patent is extended or adjusted under 35 U.S.C. 154(b) by 67 days.

(21) Appl. No.: 15/204,932

(22) Filed: Jul. 7, 2016

(65) Prior Publication Data

US 2017/0037978 A1 Feb. 9, 2017

(30) Foreign Application Priority Data

Aug. 9, 2015 (JP) .................. 2015-157839
Jun. 9, 2016 (JP) .................. 2016-115547

(51) Int. Cl.
*F16K 5/08* (2006.01)
*F01M 11/04* (2006.01)
*F16K 5/06* (2006.01)
*F01M 11/00* (2006.01)
*F16K 31/60* (2006.01)
(Continued)

(52) U.S. Cl.
CPC ....... *F16K 5/0626* (2013.01); *F01M 11/0004* (2013.01); *F01M 11/0408* (2013.01); *F16K 5/0647* (2013.01); *F16K 5/0689* (2013.01); *F16K 27/067* (2013.01); *F16K 31/602* (2013.01); *F16K 35/027* (2013.01)

(58) Field of Classification Search
CPC .... F16K 5/0626; F16K 31/602; F16K 5/0689; F01M 11/0408; F01M 11/0004
See application file for complete search history.

(56) References Cited

U.S. PATENT DOCUMENTS

D56,925 S   1/1921  Humphrey
D56,926 S   1/1921  Humphrey
(Continued)

FOREIGN PATENT DOCUMENTS

CH          163683 A     8/1933
DE    102015209919 A1    3/2015
(Continued)

OTHER PUBLICATIONS

Fumoto Giken Co., Ltd., Publication of U.S. Appl. No. 85/837,373, Published on Apr. 22, 2014.
(Continued)

*Primary Examiner* — Kevin Lee
(74) *Attorney, Agent, or Firm* — Koffsky Schwalb LLC; Mark I. Koffsky

(57) ABSTRACT

A fastening member which penetrates a housing unit is provided with respect to a main body of an opening and closing valve. The fastening member is capable of rotating freely with respect to the main body, the tip end of the fastening member is connected to a discharge port of a container, and the fastening member has an action of fastening and fixing the main body to the discharge port side of the container. When the attachment orientation of the main body has been determined, the attachment orientation of the main body can be fixed in an optional state by fastening the fastening member.

6 Claims, 15 Drawing Sheets

(51) Int. Cl.
*F16K 35/02* (2006.01)
*F16K 27/06* (2006.01)

(56) References Cited

U.S. PATENT DOCUMENTS

| | | | |
|---|---|---|---|
| 3,367,623 A * | 2/1968 | Piel | F16K 5/06 |
| | | | 251/144 |
| 3,623,698 A | 11/1971 | Couper et al. | |
| 3,726,503 A | 4/1973 | Fawkes | |
| 3,954,250 A | 5/1976 | Grace | |
| 4,078,763 A | 3/1978 | Yamamoto | |
| 4,380,247 A | 4/1983 | Douglas | |
| D297,354 S | 8/1988 | Wirth | |
| 4,964,614 A | 10/1990 | Sands et al. | |
| 5,072,913 A | 12/1991 | Carroll | |
| 5,275,200 A | 1/1994 | Yamamoto | |
| D375,141 S | 10/1996 | Valley | |
| 6,325,355 B1 | 12/2001 | Johnson | |
| D455,818 S | 4/2002 | Yamamoto | |
| 6,371,155 B1 | 4/2002 | Balocca | |
| D500,123 S | 12/2004 | Pelletz | |
| D505,184 S | 5/2005 | Trappa | |
| D516,678 S | 3/2006 | Tripp et al. | |
| 7,226,285 B2 | 6/2007 | Tsai | |
| 7,712,797 B2 * | 5/2010 | Lum | F16K 5/0626 |
| | | | 285/368 |
| 7,849,877 B2 | 12/2010 | Tan et al. | |
| 8,327,867 B2 | 12/2012 | Caleffi | |
| D681,170 S | 4/2013 | Yamamoto | |
| D681,171 S | 4/2013 | Yamamoto | |
| D701,945 S | 4/2014 | Mitsuoka | |
| D701,946 S | 4/2014 | Mitsuoka | |
| D730,491 S | 5/2015 | Yamamoto et al. | |
| 2003/0205687 A1 | 11/2003 | McPeak et al. | |
| 2006/0191960 A1 | 8/2006 | Shelton | |
| 2007/0163654 A1 | 7/2007 | Elliott | |
| 2009/0256095 A1 * | 10/2009 | Osterwise et al. | F16K 5/0626 |
| | | | 251/144 |
| 2010/0313966 A1 | 12/2010 | Murg et al. | |
| 2012/0085182 A1 * | 4/2012 | Untch | F16K 5/0626 |
| | | | 73/863.86 |
| 2014/0124056 A1 | 5/2014 | Zeyfang | |
| 2015/0041689 A1 | 2/2015 | Rucinski | |
| 2015/0345659 A1 | 12/2015 | Yamamoto et al. | |

FOREIGN PATENT DOCUMENTS

| | | |
|---|---|---|
| EP | 2110589 A2 | 10/2009 |
| GB | 473048 A | 10/1937 |
| GB | 521848 A | 6/1940 |
| GB | 526708 A | 9/1940 |
| GB | 1173090 A | 12/1969 |
| GB | 1222210 A | 2/1971 |
| JP | S49-38917 Y | 10/1974 |
| JP | S59-113374 A | 6/1984 |
| JP | S59-113375 A | 6/1984 |
| JP | S59-147171 A | 8/1984 |
| JP | S59-231274 A | 12/1984 |
| JP | S60-260773 A | 12/1985 |
| JP | 837859 S | 5/1992 |
| JP | H05-79137 U | 10/1993 |
| JP | H05-83560 U | 11/1993 |
| JP | 837859 S | 4/1995 |
| JP | 2546566 Y2 | 5/1997 |
| JP | D1113929 S | 7/2001 |
| JP | 2002-106731 A | 4/2002 |
| JP | 2005-233395 A | 9/2005 |
| JP | 2015-161337 A | 9/2015 |
| JP | 2016-6346 A | 1/2016 |

OTHER PUBLICATIONS

Fumoto Giken Co., Ltd., Publication of U.S. Appl. No. 85/828,222, Published on Apr. 22, 2014.

* cited by examiner

OPENING AND CLOSING VALVE

This application claims priority under 35 U.S.C. § 119 from Japanese Patent Application Serial No. 2015-157839, filed Aug. 9, 2015 and Japanese Patent Application Serial No. 2016-115547, filed Jun. 9, 2016, both of which are incorporated herein by reference in their entirety.

TECHNICAL FIELD

The present invention pertains to an opening and closing valve which operates to open and close the flow of a liquid, and more specifically, pertains to an opening and closing valve for which the attachment direction can be set to an optional position.

BACKGROUND

In the past, the applicant has proposed an opening and closing valve that can be attached to a discharge port of a liquid container. As described in Japanese Utility Model Application Publication No. H05-083560, the opening and closing valve thereof is provided with a base end part having an inflow port for a liquid in a container, an operation lever for opening and closing the valve, a valve body which is opened and closed by rotating the operation lever, and a discharge port which communicates to the inflow port when the valve is opened. Furthermore, a male screw which helically engages with a female screw formed at the discharge port of the container is formed at the base end part where the inflow port is formed at the base end.

SUMMARY OF THE INVENTION

A drawback of conventional opening and closing valves is that if the valve thereof is mounted to a discharge port of a container, the orientation of the opening and closing valve that has been screwed in changes depending on the notch position of the female screw formed at the inner circumferential surface and the notch position of the male screw formed at the base end part, and the opening and closing valve cannot be fixed in the desired orientation. For example, as shown in FIG. 13, when an opening and closing valve VB is screwed into a discharge port of a container T, an attachment part VB2 of an opening and closing operation lever VB4 is fixed at the left side rather than being positioned at the top.

Moreover, if the size of a discharge port T1 or the pitch of the female screw differ, an opening and closing valve having a base end part of a shape that is tailored to each size of the discharge ports or each pitch must be prepared, resulting in the problem of needing to stock a large quantity of opening and closing valves in inventory.

In this type of case, conventionally, as shown in FIG. 14 and FIG. 15, a measure is adopted for which an adapter AD is inserted between the discharge port T1 and the base end part of the opening and closing valve VB. The adapter AD has a base end connecting part AD1 that helically engages with the discharge port T1, and a tip end connecting part AD2 to which the base end part of the opening and closing valve VB connects. The base end connecting part AD1 and the tip end connecting part AD2 are of a communicated configuration such that discharging liquid is allowed to flow. By interposing this type of adapter AD, the opening and closing valve VB can be connected in a desired orientation, and the types of pitches and diameters of the base end connecting part of the opening and closing valve VB can be reduced. However, by providing the adapter AD, the volume occupied by the entire opening and closing valve increases, and therefore attachment is difficult at locations where the attachment space is small, which is a problem.

Therefore, an object of the present invention is to provide an opening and closing valve for which the orientation of the opening and closing valve in the attached state can be optionally set, and which can inexpensively provide a structure capable of supporting numerous types of connection ports.

The present invention is provided with the following configuration in order to solve the abovementioned problem.

(1) An opening and closing valve provided with:

a valve body housed in a valve storage unit within a main body, and capable of switching to an opened position and a closed position;

an operating means for switching the valve body to the opened position or the closed position;

a discharge path having one end communicating to a valve chamber of the main body, and another end communicating to a discharge port;

a fastening member having at a leading end side a connecting part that screws onto a discharge port of a container;

a storage unit provided at the main body and penetrated by the fastening member in a freely rotatable manner; and a flow path having one end communicating to the valve chamber of the main body, and another end communicating to the storage unit;

and at the opened position, flow between the discharge port and the flow path is enabled, and at the closed position, flow between the discharge port and the flow path is interrupted;

wherein the fastening member is provided with:

a communicating path having one end communicating to inside the container and another end communicating to the flow path in a state that the fastening member is connected with the discharge port or the container; and a fastening part projecting to the outside of the storage unit and which is used to fasten the main body to the discharge port of the container from the outside of the storage unit;

and the main body is fixed to the discharge port of the container with the storage unit in a liquid-sealed state by fastening the main body using the fastening member in a state that the fastening member is connected with the discharge port of the container.

(2) An opening and closing valve provided with:

a valve body housed in a valve storage unit within a main body, and capable of switching to an opened position and a closed position;

an operating means for switching the valve body to the opened position or the closed position;

a discharge path having one end communicating to a valve chamber of the main body, and another end communicating to a discharge port;

a fastening member having at a leading end side a connecting part that screws onto the discharge port of a container;

a storage unit provided at the main body and penetrated by the fastening member in a freely rotatable manner;

and a flow path having one end communicating to the valve chamber of the main body, and another end communicating to the storage unit;

and at the opened position, flow between the discharge port and the flow path is enabled, and at the closed position, flow between the discharge port and the flow path is interrupted;

wherein the fastening member is provided with:

a communicating path having one end communicating to inside the container and another end communicating to the flow path in a state that the fastening member is connected with the discharge port of the container;

a fastening part projecting to the outside of the storage unit and which is used to fasten the main body to the discharge port of the container from the outside of the storage unit; and a pair of packings arranged sandwiching the flow path between an outer peripheral surface of the fastening member positioned inside the storage unit and an inner wall of the storage unit.

(3) The opening and closing valve according to the abovementioned (1) or (2), wherein a fitting hole for connecting a tool for implementing fastening work is formed at a center part in the fastening part of the fastening member.

(4) The opening and closing valve according to any one of the abovementioned (1) to (3), further including a discharge adapter having a base end connected to the discharge side of the discharge path, and a tip end connected to a discharge pipe.

According to the present invention set forth by claim 1, when the connecting part of the fastening member is inserted into the discharge port of the container and loosely tightened, the main body is capable of rotating centered on the fastening member. In this state, the attachment orientation of the main body is determined, and then the fastening member is further tightened to the discharge port of the container, thereby fastening and securing the main body to the discharge port of the container. Through this type of operation, a beneficial effect is exhibited of being able to set the attachment orientation of the main body to an optional orientation. Also, by preparing multiple types of thread pitches and diameters of the connecting part of the fastening member according to the pitch and diameter of the discharge port of the container, there is no need to prepare multiple types of sizes and shapes of the opening and closing valve main body.

According to the invention set forth by claim 2, packings are arranged between the fastening member and the storage unit, and therefore even after the opening and closing valve is installed, the orientation of the main body can be changed without any liquid leaking.

According to the invention set forth by claim 3, a tool connecting part formed at the fastening part of the fastening member is a hole at a center part, and therefore, if room for connecting a wrench or other tool in a surrounding area of the opening and closing valve is minimal, a tool can be easily connected, thereby facilitating the attachment work.

According to the invention set forth by claim 4, by connecting a discharge adapter at a tip end, a discharge tube can be used to easily move a liquid inside the container to another container.

DETAILED DESCRIPTION OF THE INVENTION

Figure 1:
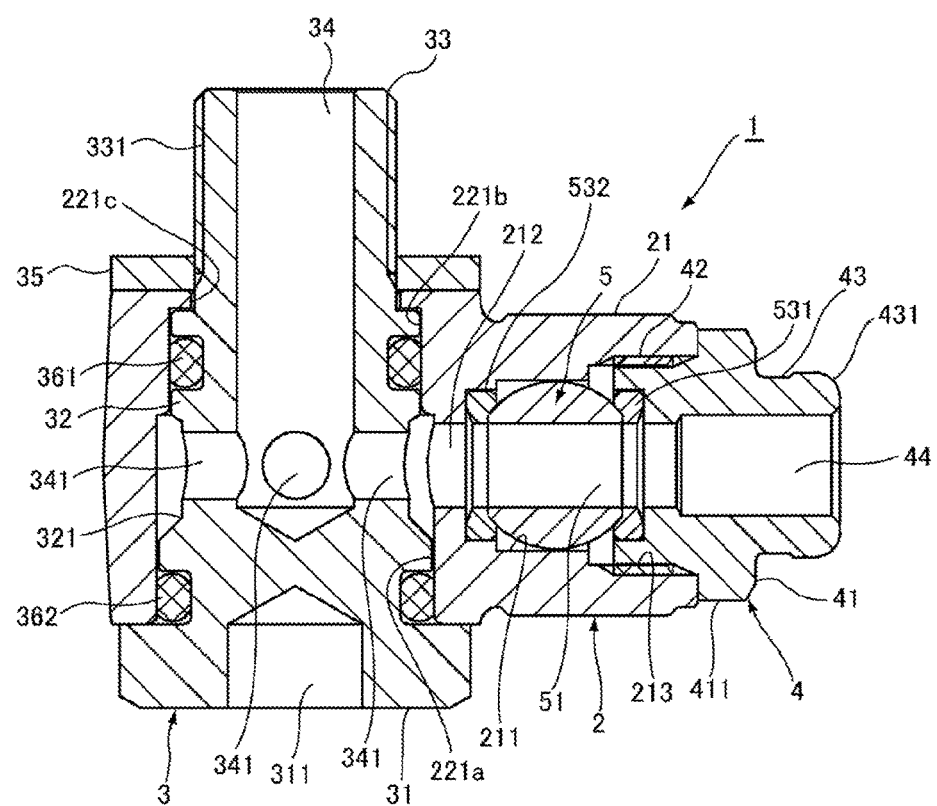
FIG. 1 is a cross-sectional plan view of the opening and closing valve of the present invention.
Figure 2:
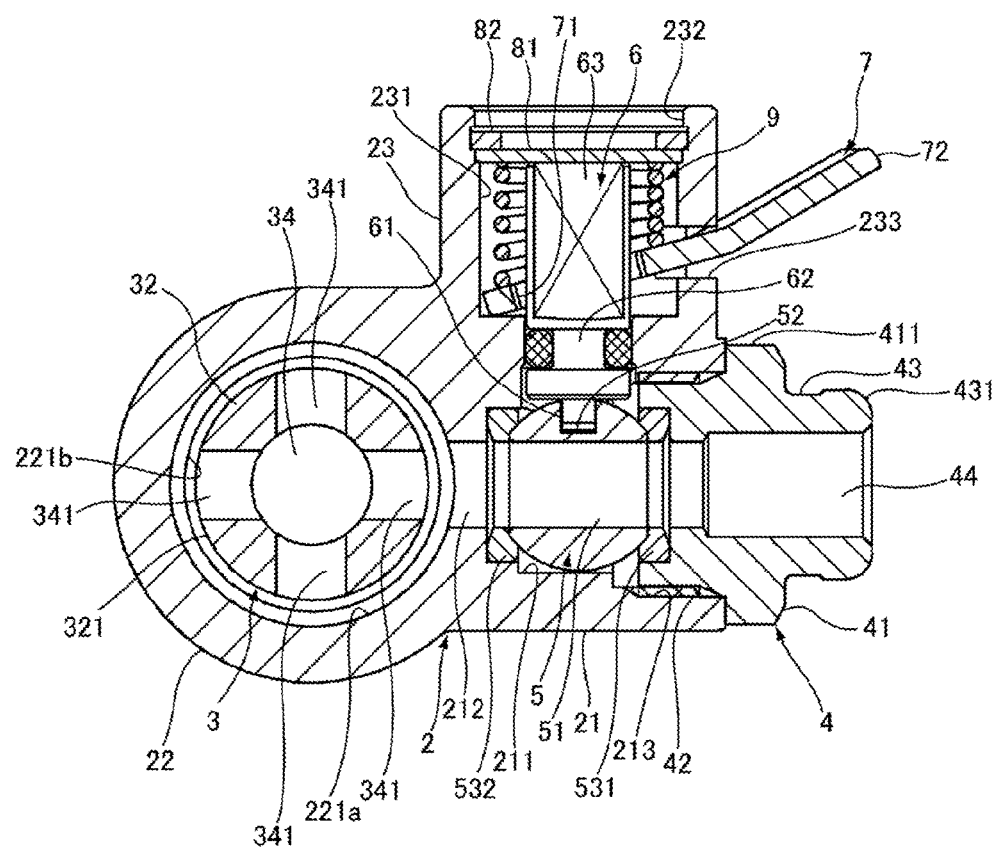
FIG. 2 is a cross-sectional elevation view of the opening and closing valve of the present invention.

A preferred embodiment of the present invention is described below based on the attached drawings. FIG. 1 is a cross-sectional plan view of the opening and closing valve of the present invention, and FIG. 2 is a cross-sectional elevation view of the same. An opening and closing valve 1 is provided with a main body 2, a fastening member 3, and a lid body 4. The main body 2 has a valve body storage unit 21 for housing a valve body 5, a housing unit 22 for housing the fastening member 3, and an operation storage unit 23 in which a mechanism for opening and closing the valve body 5 is stored.

A valve chamber 211 which stores the valve body 5 at the inside is provided in the valve body storage unit 21. A below-described flow path 212 communicating to the housing unit 22 is provided at the innermost part of the valve chamber 211. An opening 213 is formed at a side opposite of the flow path 212, and a female screw is formed at the inner circumferential surface. The flow path 212, valve chamber 211, and opening 213 respectively have a cross-sectional shape that is circular, and are arranged on the same axis. The housing unit 22 and the operation storage unit 23 are formed such that the axis is positioned in a direction orthogonal to the axis connecting the flow path 212, valve chamber 211, and opening 213.

The spherical valve body 5 is housed in the valve chamber 211. A passage 51 formed along the axis is formed at the center of the valve body 5. An engaging concavity 52 is formed on an axis which is orthogonal to the axis of the passage 51. Furthermore, ring shaped packings 531 and 532 are respectively arranged at the perimeters of holes formed at both ends of the passage 51, and are inserted between an inner wall of the valve chamber 211 and the outer peripheral surface of the valve body 5. The valve body 5 is maintained so as to be capable of rotating freely when sandwiched between the packings 531 and 532. Furthermore, the position where the openings of both ends of the passage 51 face the flow path 212 and the opening 213 is the opened position. The position where the axis of the passage 51 forms a right angle with the axis of the passage 51 in the opened position is the closed position. The valve body 5 is configured such that it can rotate between the opened position and the closed position at a range with a rotation angle of 90 degrees. Rotation of the valve body 5 is realized by rotating a rotation shaft 6 having an axis which intersects the axis of the passage 51 at a right angle.

Figure 3:
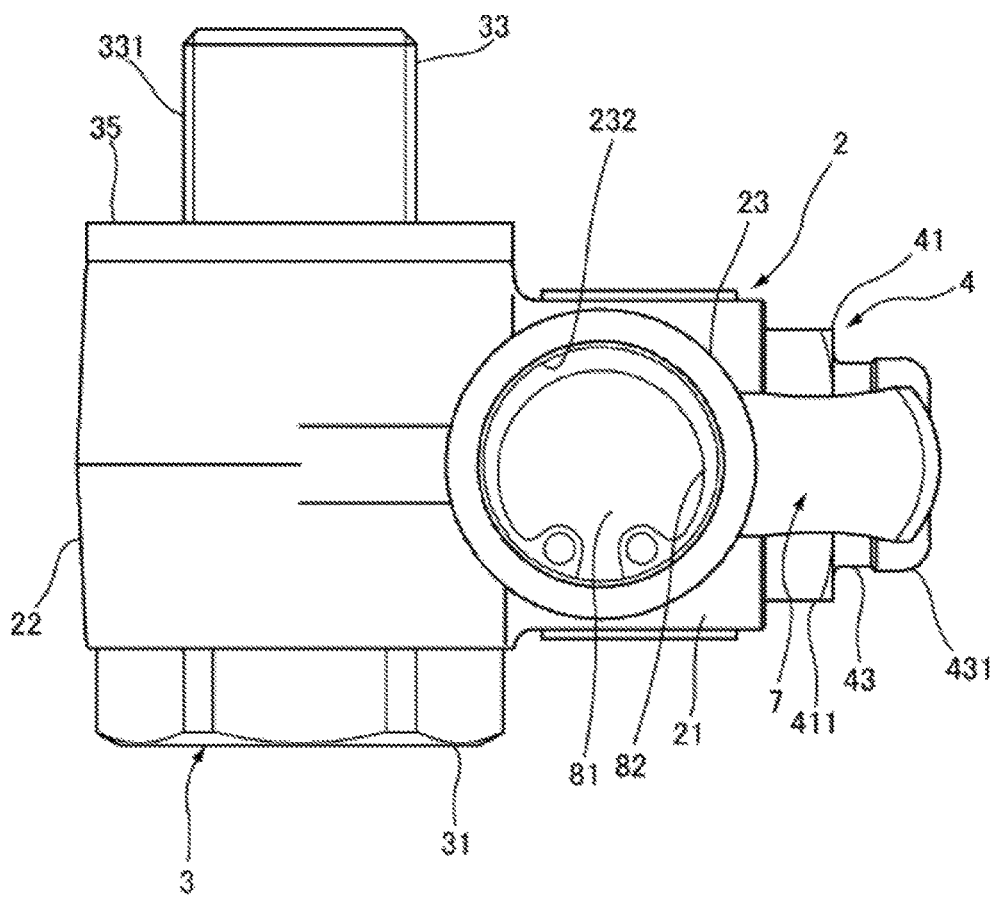
FIG. 3 is a plan view of the opening and closing valve of the present invention.

The operation storage unit 23 formed in a tubular shape has a housing space 231 for housing internally the rotation shaft 6 and the spring 9. The lower end part of this housing space 231 communicates to the valve chamber 211. As shown in FIG. 3, a lid member 81 is fitted as a spring receiver to the opening 232 of the upper end part of the housing space 231, and at the upper side, a C-ring 82 which presses on the lid member 81 is further inserted at the inner periphery of the opening 232.

The rotation shaft 6 arranged along the axis of the housing space 231 has an engaging convexity 61 that engages with the engaging concavity 52 of the valve body 5, and has a lever connecting part 63 via a shaft part 62. By engaging the engaging convexity 61 and the engaging concavity 52, the rotation shaft 6 and the valve body 5 rotate as an integrated body. An operation lever 7 is connected to the lever connecting part 63. The operation lever 7 has a connection hole 71 connecting to the lever connecting part 63 inside the housing space 231 and an operating unit 72 extended to the outside from the housing space 231. The connection hole 71 has a polygon shape, and the lever connecting part 63, which has the same polygon-shaped cross section as the shape of the connection hole 71, is inserted into the connection hole 71. Through this type of mating, the rotation shaft 6 rotates as an integrated body as a result of the swinging operation of the operation lever 7, and ultimately, the valve body 5 can be opened and closed. A compression spring 9 is inserted between the lid member 81 and a base end part provided for the connection hole 71 of the operation lever 7, and the operation lever 7 is constantly biased in the direction of the valve body 5.

Figure 4:
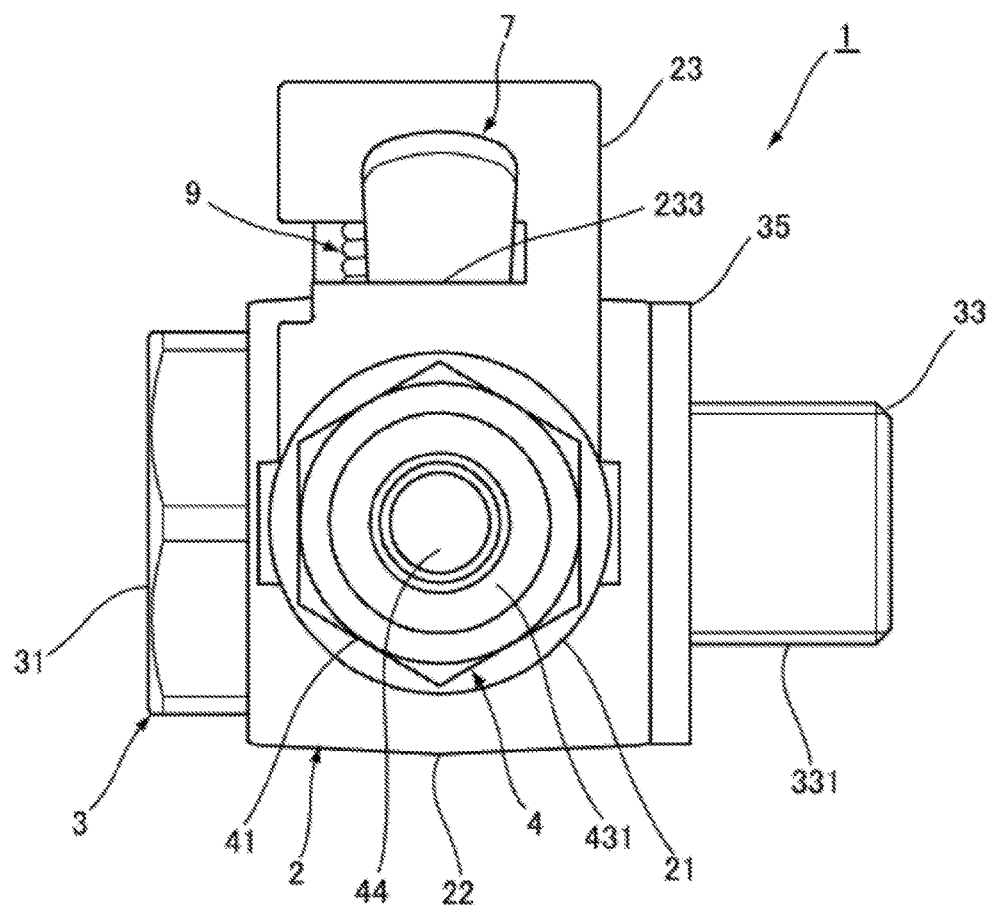
FIG. 4 is a side view of the opening and closing valve of the present invention.
Figure 5:
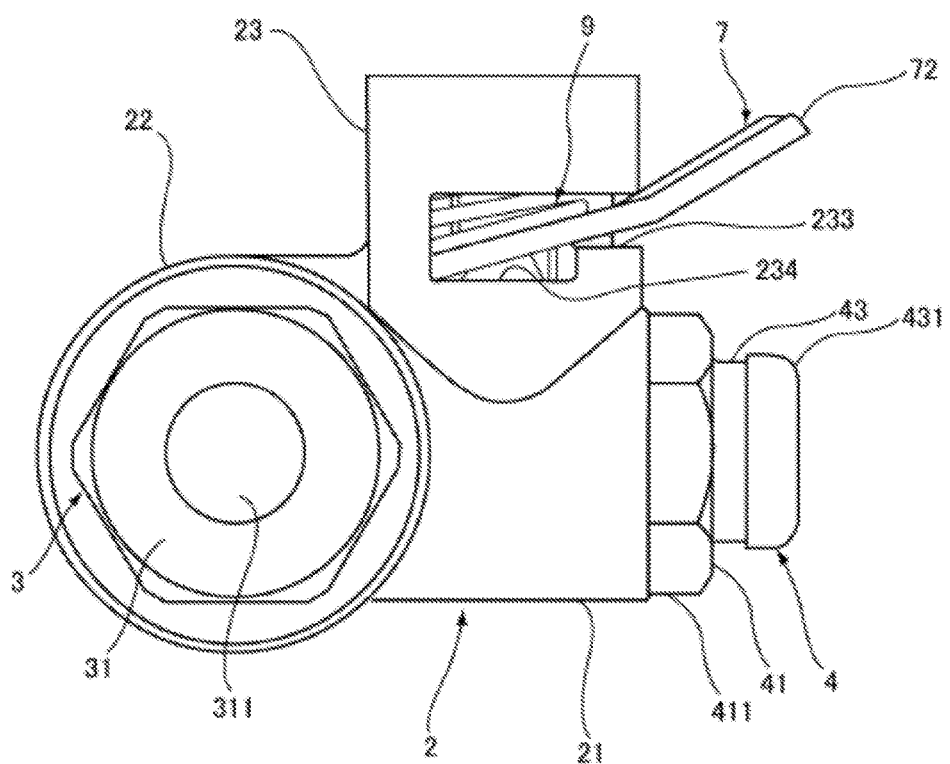
FIG. 5 is an elevation view of the opening and closing valve of the present invention.

As shown in FIG. 4 and FIG. 5, the operation lever 7 is inserted into the regulation slits 233 and 234, which are regulating holes formed at the outer perimeter of the operation storage unit 23, and swings within the range of the regulation slits 233 and 234 thereof Furthermore, when the operation lever 7 is positioned inside the regulation slit 233, the valve body 5 is at the opened position, and when the operation lever 7 is positioned in the regulation slit 234, the valve body 5 is positioned at the closed position. A step part is formed between the regulation slit 233 corresponding to the opened position and the regulation slit 234 corresponding to the closed position, and the regulation slit 234 is configured so as to be indented at the valve body side. In other words, the configuration is such that because the operation lever 7 in the regulation slit 234 is always biased in the direction of the valve body 5. Thus the operation lever 7 that is moved to inside the regulation slit 234 is pressed to the inside of the regulation slit 234 by the spring 9, and does not easily move to the regulation slit 233 side because of the step. Through this type of configuration, when the opening and closing valve 1 is in a closed state, it cannot be accidentally moved to the opened state. A rotation range regulation means for regulating the range of rotation of the operation lever 7 is configured through the regulation slits 233, 234, and a positioning means for positioning the operation lever in the closed position is configured by the regulation slit 234.

The positional relationship of the operation lever 7 and this type of opened position-closed position of the valve body 5 can also be changed according to the position at which the opening and closing valve 1 is attached. For example, if the opening and closing valve 1 of the present invention is attached at the underside of a machine which moves a vehicle or the like, there is a concern that the operation lever 7 could contact an obstacle on the ground when travelling, and this could cause the operation lever 7 to move to the opened position at that time. In this type of case, the direction of the operation lever 7 may be set such that if the operation lever 7 is set to a direction parallel to the exhaust path, the valve body 5 will be in a closed position, and if it is set in a direction that intersects the exhaust path, the valve body 5 will be in an opened position.

As shown in FIG. 1 and FIG. 2, the lid body 4 is connected to the opening 213. The lid body 4 has a lid body connecting part 42 connected to the opening 213, a bolt part 41 positioned at the base end side of the lid body connecting part 42, a discharge tool connecting part 43 formed at the leading end side of the bolt part 41, and a discharge path 44 having respective end part openings at the base end of the lid body connecting part 42 and the tip end of the discharge tool connecting part 43. A male screw which helically engages with the female screw formed at the inside of the opening 213 is formed at the outer circumference of the lid body connecting part 42.

The valve chamber 211 is completed by connecting the lid body 4 to the opening 213. The valve body 5 is housed and retained in the valve chamber 211. The abovementioned packing 531 is inserted at the inner side of the lid body connecting part 42, the packing 531 and the packing 532 are reasonably pressed against the outer perimeter of the valve body 5 by screwing the lid body connecting part 42, and a liquid-sealing effect is thereby exhibited.

Figure 6:
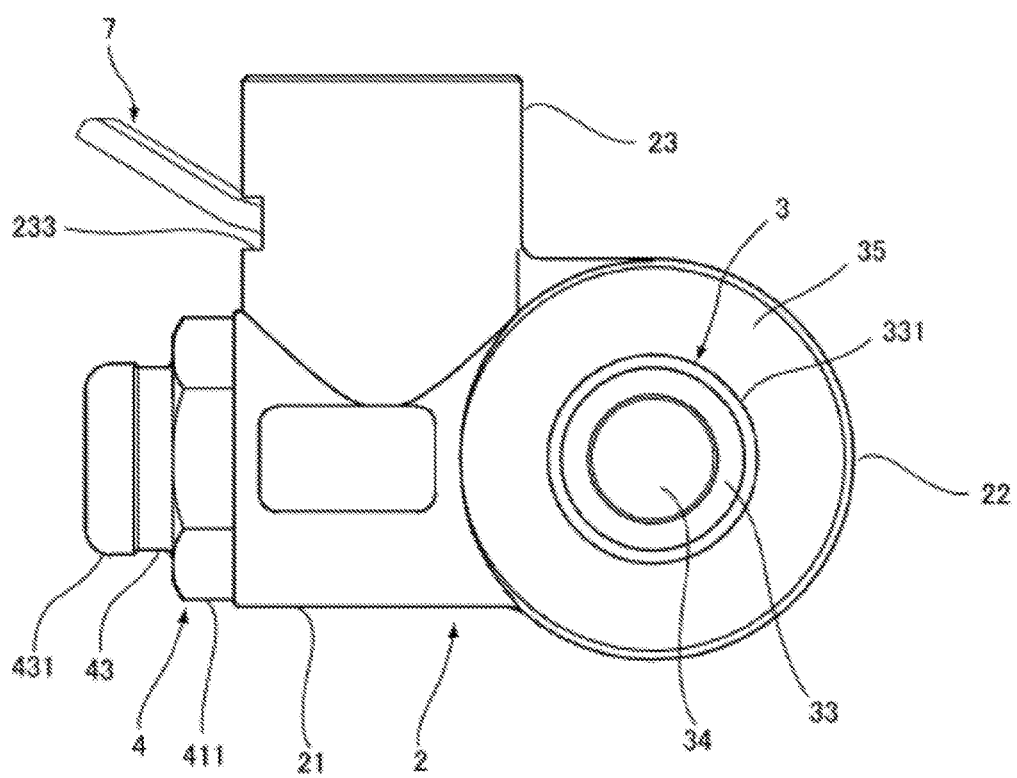
FIG. 6 is a back view of the opening and closing valve of the present invention.

As shown in FIG. 4, FIG. 5, and FIG. 6, the bolt part 41 of the lid body 4 is a hexagon bolt shape, and the lid body connecting part 42 is screwed to the opening 213 by using a wrench or other tool to rotate the bolt part 41 thereof The discharge tool connecting part 43 has a tip end part 431 with a diameter that is larger than that of the base end part, and the tip end opening of the discharge path 44 is formed at the center of the tip end part 431. The tip end part 431 is shaped with roundness so as to facilitate removal of a discharge tool 10.

Figure 7:
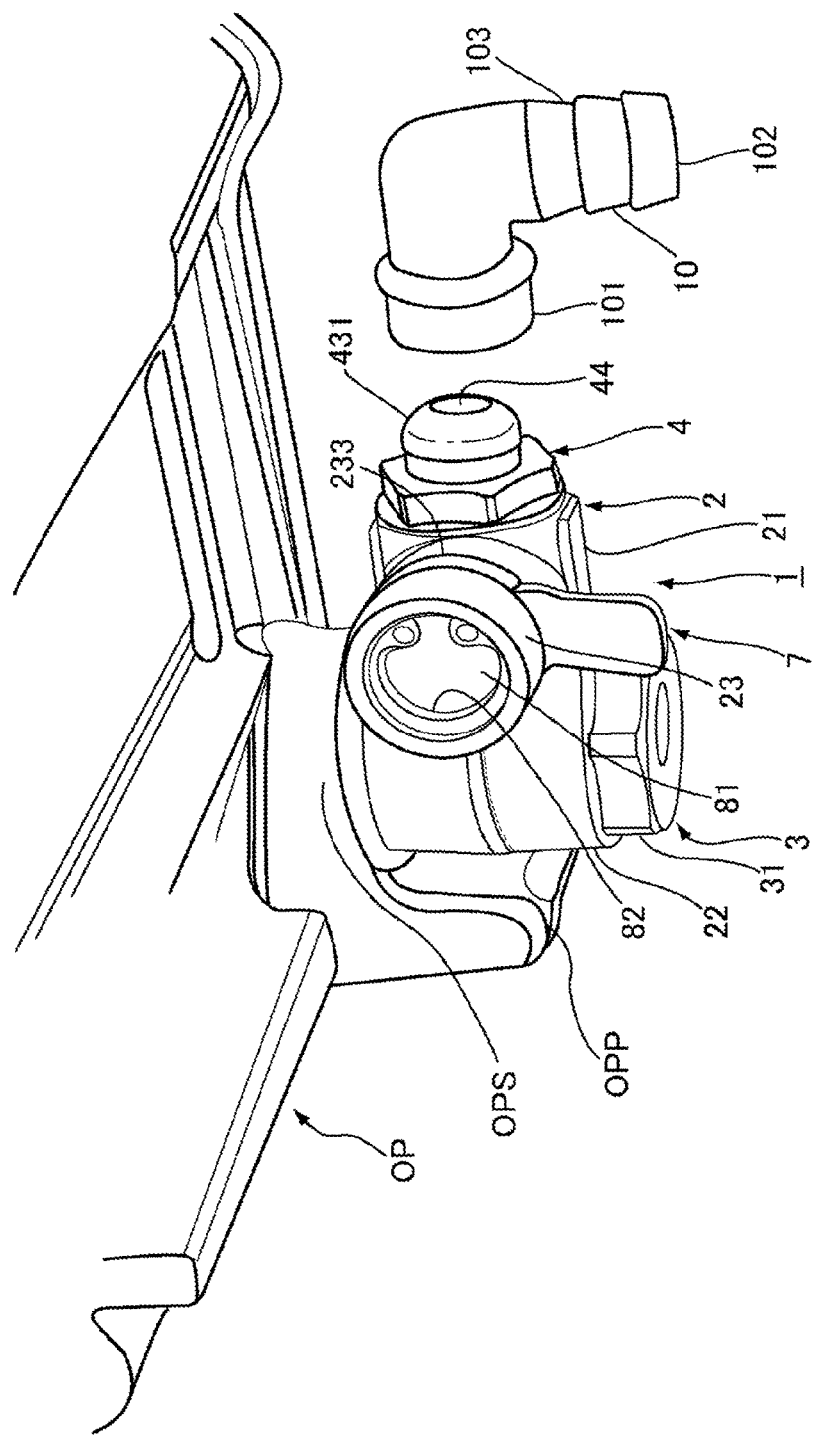
FIG. 7 is a perspective view showing an attachment state of the present invention.

As shown in FIG. 7, the discharge tool 10, which is a discharge adapter, is connected to the discharge tool connecting part 43. The discharge tool 10 is a bent, tube-shaped member, and has a base end connecting part 101 for connecting to the discharge tool connecting part 43, and a discharge pipe connecting part 102 provided at the tip end for connecting a hose or other discharge pipe. The discharge pipe connecting part 102 has a diameter which is reduced towards the tip end so as to facilitate connection of a discharge pipe, and a convex-concave part 103 is formed at the outer perimeter thereof The convex-concave part 103 is arranged in the axial direction with a convex part having a mountain-shaped cross-section in continuity. The cross-sectional shape of the convex part is configured such that an incline of the leading end side is gradual, while the incline at the base end side is intense, and is configured such that the frictional resistance when connecting the discharge pipe is minimal, and the frictional resistance when removing the discharge pipe is large. The discharge tool 10 is made of resin, and can be inexpensively and easily formed in an optional shape. In other words, the shape of the discharge tool 10 is not limited to a bent shape, and can be formed in any optional shape suited for the conditions surrounding the attachment position such as a linear shape, spiral shape, crank shape, arc shape, and the like.

Next, the housing unit 22 and the fastening member 3 are described. The housing unit 22 formed at the main body 2 has a cross-sectional shape that is a round hole, and the fastening member 3 is stored at the inside thereof. The flow path 212 is opened inside the housing unit 22. The axis of the housing unit 22 is set so as to be perpendicular to the axis connecting the flow path 212, the valve chamber 211, and the opening 213. In order from the insertion opening in which the fastening member 3 is inserted, the inner diameter of the housing unit 22 is provided with a large diameter part 221a, a medium diameter part 221b, and a small diameter part 221c, and the fastening member 3 is a circular tube-shaped member having roughly the same diameters as these diameters. The fastening member 3 is inserted along the axial direction of the housing unit 22.

The fastening member 3 has a discharge port connecting part 33 at the tip end, a fastening member main body 32, and a fastening part 31 at the base end. A male screw 331 which screws onto a female screw formed at the inside of container discharge port OPS is formed at the outer perimeter of the discharge port connecting part 33. The outer diameter of the base end part of the discharge port connecting part 33 roughly matches the inner diameter of the small diameter part 221c of the housing unit 22. The outer diameter of the leading end side of the fastening member main body 32 forms a medium diameter part roughly matching the inner diameter of the medium diameter part 221b of the housing unit 22, and the outer diameter of the base end side of the fastening member main body 32 forms a large diameter part roughly matching the inner diameter of the large diameter part 221a of the housing unit 22. As shown in FIG. 1 and FIG. 2, a groove 321 is formed in the circumferential direction at the outer circumference at the large diameter part, and at the base of the groove 321, communication holes 341, 341, 341, and 341 are formed. Each communication hole 341, 341, 341, and 341 communicates to the base end part of a communicating path 34 formed from the tip end of the discharge port connecting part 33 to the fastening member main body 32 at the inner side of the fastening member 3. The groove 321 is provided at a position facing the flow path 212 with the fastening member 3 housed in the housing unit 22. 0-ring shaped packings 361 and 362 are buried at both sides sandwiching the groove 32 to thereby maintain a liquid-sealed state between the fastening member 3 and the housing unit 22 and suppress liquid leaks from the groove 32.

The fastening part 31 is provided as the base end side of the fastening member main body 32. The fastening part 31 has an outer diameter which is larger than the inner diameter of the large diameter part 221a of the housing unit 22, and configures the hexagon-shaped bolt head. A hole 311 is formed at the center of the fastening part 31. A wrench or other tool is connected to the bolt head part of this fastening part 31 to screw the fastening member 3 to the discharge port OPS, and as a result, the housing unit 22 of the main body 2 is fastened between the fastening part 31 and the discharge port OPS, and is fastened to a container OP side. At this time, leaking of discharging liquid can be prevented by inserting a packing 35 between the discharge port OPS and the end face of the housing unit 22. If the packing 35 is inserted, the O-ring shaped packing 361 is not necessarily required. Likewise, while not illustrated, if a packing is inserted between the fastening part 31 and the end face of the housing unit 22, the O-ring shaped packing 362 is not required. If the O-ring shaped packings 361 and 362 are used, even after the opening and closing valve 1 of the present invention has been installed, and work to discharge the liquid from inside the container has been performed, the leaking of liquid can be suppressed even if the fastening member 3 is loosened and work to change the direction of the opening and closing valve 1 is performed.

If the O-ring shaped packings 361 and 362 are not used, and a configuration with packing inserted at both end faces of the housing unit 22 is adopted, a configuration in which the O-ring shaped packings 361 and 362 are buried is not required, and therefore initial costs can be reduced. An opening and closing valve 1 of the present invention having a configuration as described above is, for example, used by being attached to a discharge port OPS under an oil pan OP of a motorcycle. The oil pan OP of a motorcycle is exposed at the underside of a motorcycle frame, and the discharge port OPS is provided at the base part thereof The oil pan OP is provided with a guard rib OPP around the discharge port OPS in order to protect the discharge port OPS from contacting an obstacle on the road while the motorcycle is being driven.

If the opening and closing valve 1 is attached to the discharge port OPS, the direction of the discharge path 44 must be set so as to avoid the guard rib OPP thereof Therefore, after the direction of the main body 2 is set in a direction such that the discharge path 44 does not overlap the position of the guard rib OPP, the fastening member 3 is screwed to the discharge port OPS. The fastening member 3 is capable of rotating freely with respect to the main body 2, and therefore, the direction of the main body 2 can be fixed in a desired direction regardless of the fastening of the fastening member 3. Furthermore, the housing unit 22 of the main body 2 is fastened and secured between the fastening part 31 and the discharge port OPS by fastening the fastening member 3.

The position of the operation lever 7 shown in FIG. 7 is a position at which the valve body 5 is at the closed position. When the operation lever 7 is swung to the opened position after the opening and closing valve 1 has been installed at the discharge port OPS, the valve body 5 shifts to the opened position, and as shown in FIG. 1 and FIG. 2, the flow path 212 and the discharge path 44 communicate via the passage 51. In this manner, the liquid in the container OP passes through the communicating path 34, the communication holes 341, 341, 341, and 341, and the groove 321, arrives at the flow path 212, further passes through the passage 51 of the valve body 5, and is discharged to the outside from the discharge path 44. Because the groove 321 is formed in the circumferential direction, no matter at which angle the main body 2 is positioned with respect to the fastening member 3, the connection from the communicating path 34 to the flow path 212 is maintained, and discharge of the liquid is smoothly performed.

Figure 8:
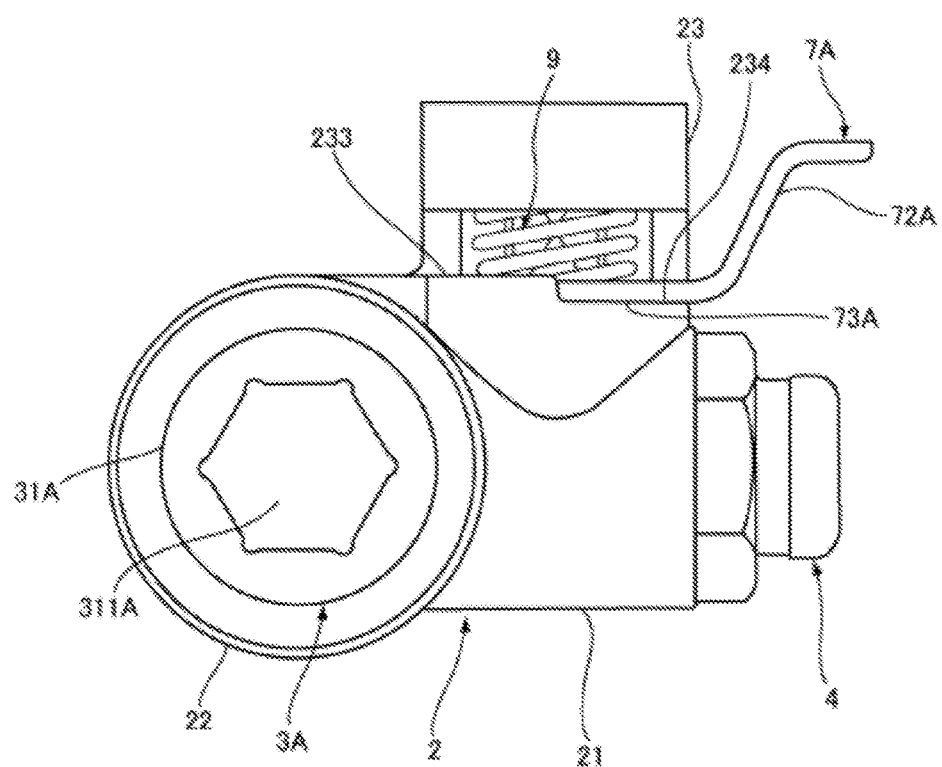
FIG. 8 is an elevation view of another configuration example of the opening and closing valve of the present invention.

With an attachment position of the opening and closing valve 1 like that shown in FIG. 7, the guard rib OPP is provided in the circumferential area, but if the height of this guard rib OPP is further increased, and the fastening part 31 is of a shape such that it is hidden by the guard rib OPP, the room needed to insert a wrench or other tool onto the bolt part in the area around the fastening part 31 is decreased. In this type of case, as shown by FIG. 8, a configuration may be adopted for which the shape of the fitting hole 311A formed at the center of the fastening part 31 is as a hexagon or other polygon shape, and an allen wrench or other rod-shaped tool may then be used to enable fastening.

Also, as described above, a configuration may be adopted for which a closed state is formed if the direction of the operation lever 7A faces the direction of the lid body 4 with the discharge path open, and for which an opened state is formed if the direction of the operation lever 7A is a direction which is parallel to the fastening member 3. In this case, the configuration is such that as shown in FIG. 8, the regulation slit 234, which is indented in the downward direction, is positioned at the lid body 4 side, and the regulation slit 233 is positioned at the side surface side. Furthermore, with the operation lever 7A, the shape of the operating unit 72A projected outward from the operation storage unit 23 can be bent into a crank shape. The step formed between the regulation slit 234 and the regulation slit 233 is configured with a thickness that is equivalent to or greater than the thickness of a base end part 73A of the operation lever 7A, and is configured such that if the operation lever 7A is positioned at the closed position, the base end part 73A fits into the housing space 231 without a gap. Moreover, the base end part 73A is closely affixed to the base of the regulation slit 234 by the spring 9, and therefore the occurrence of a gap between the circumferential end of the base end part 73A and the regulation slit 234 is suppressed.

Figure 9:
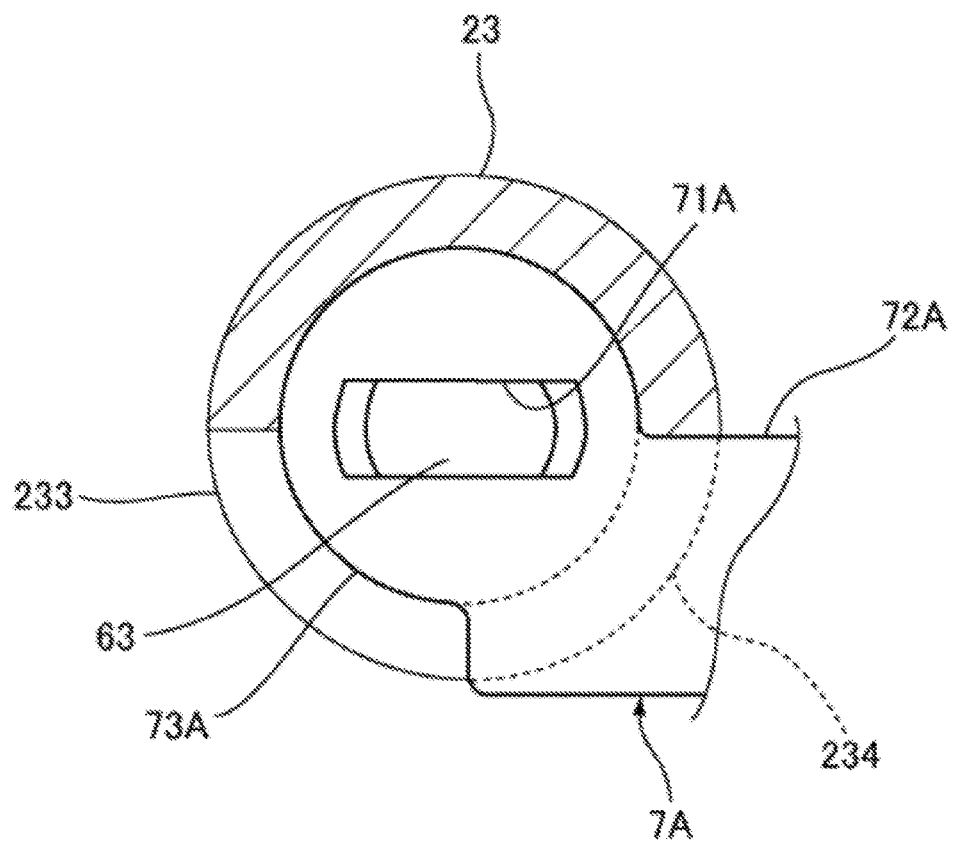
FIG. 9 is a base end part plan view of the operation lever of the other configuration example of the opening and closing valve of the present invention.

FIG. 9 is a partial plan view showing the shape of the base end part of the operation lever 7A. The base end part 73A of the operation lever 7A is formed in a shape (a round shape in the figure) matching the cross-sectional shape of the housing space 231 of the operation storage unit 23. At the closed position, the base end part 73A functions as a lid, and thus is configured to suppress the entrance of external dust, dirt, or the like at the valve chamber 211 side from the operation lever 7A. This type of lid structure is constantly exposed to outside air such as when attached to the oil container of an automatic two-wheel vehicle, and if used in an environment that includes exposure to rain, mud, dust, and the like, it provides the merit of being able to suppress malfunction of internal mechanisms such as the valve body 5.

A connection hole 71A into which the lever connecting part 63 is inserted is formed at the base end part 73A. The connection hole 71A is an elongated hole, the direction of the long side of the elongated hole matches the direction of the operating unit 72A (axial direction). The gap between the elongated connection hole 71A and the lever connecting part 63 enables the operating unit 72A to swing up and down.

Figure 10:
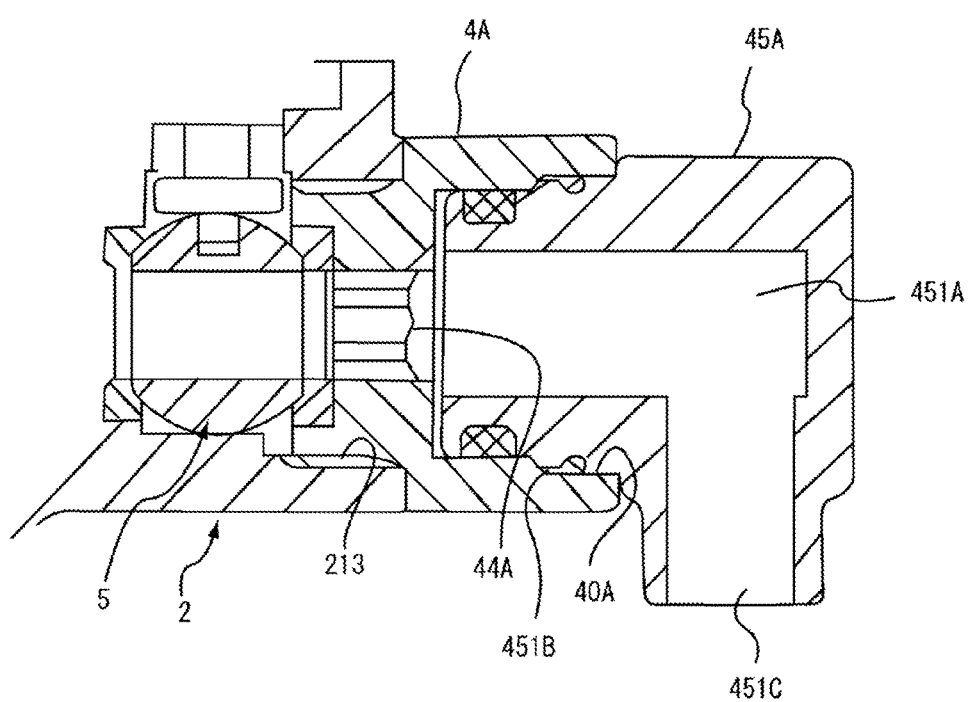
FIG. 10 is a partial cross-sectional elevation view showing another configuration example of a discharge path of the opening and closing valve of the present invention.

FIG. 10 is a cross-sectional image showing another configuration example of the lid body 4 with respect to the above-described embodiment. An L-shaped rotating connection member 45A is rotatably connected to a lid body 4A. The lid body 4A has a base end connecting part connected to the opening 213, and a discharge path 44A is formed at the center. The base end part of the rotating connection member 45A is connected to an opening 40A of the leading end side in a manner that enables the rotating connection member 45A to rotate freely. Furthermore, the rotating connection member 45A has a tip end part formed in a direction which is bent with respect to the base end part, and has a flow path 451A having a path that is bent from the base end part to the tip end part, and at the tip end, an outflow opening 451C is formed. According to this type of configuration, the rotating connection member 45A is connected in a manner which allows it to rotate freely, and therefore the outflow opening 451C can face any optional direction.

Figure 11:
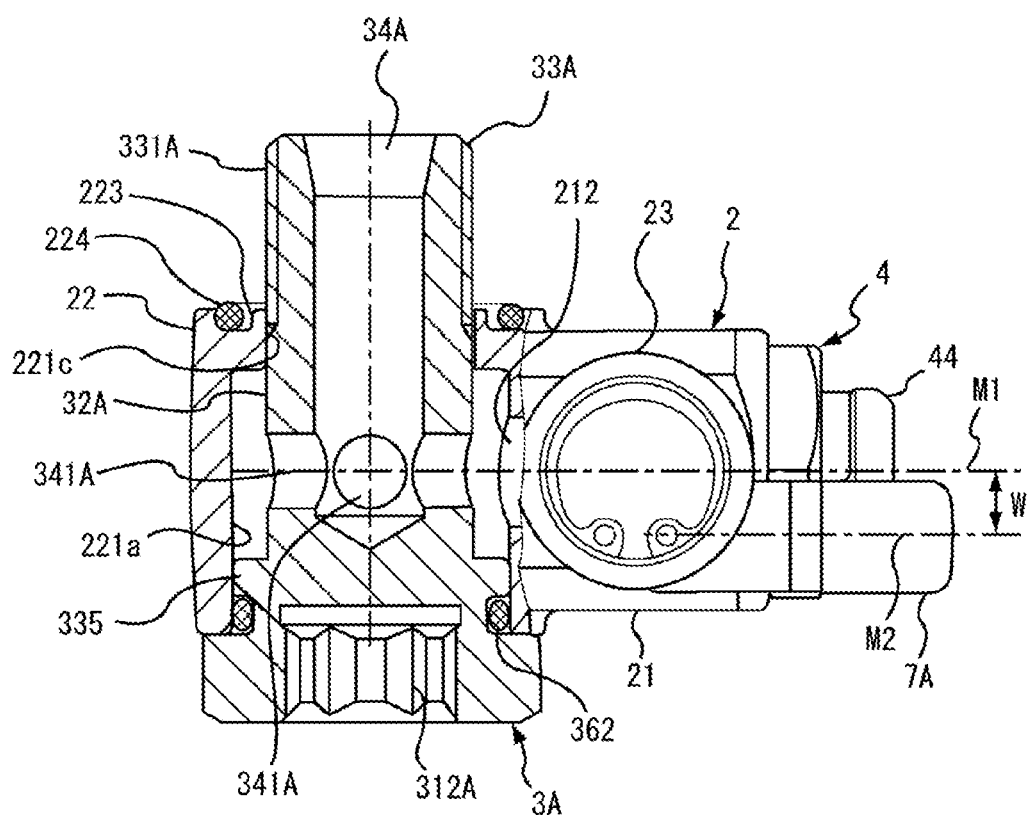
FIG. 11 is a partial cross-sectional plan view showing another configuration example of the opening and closing valve of the present invention.
Figure 12:
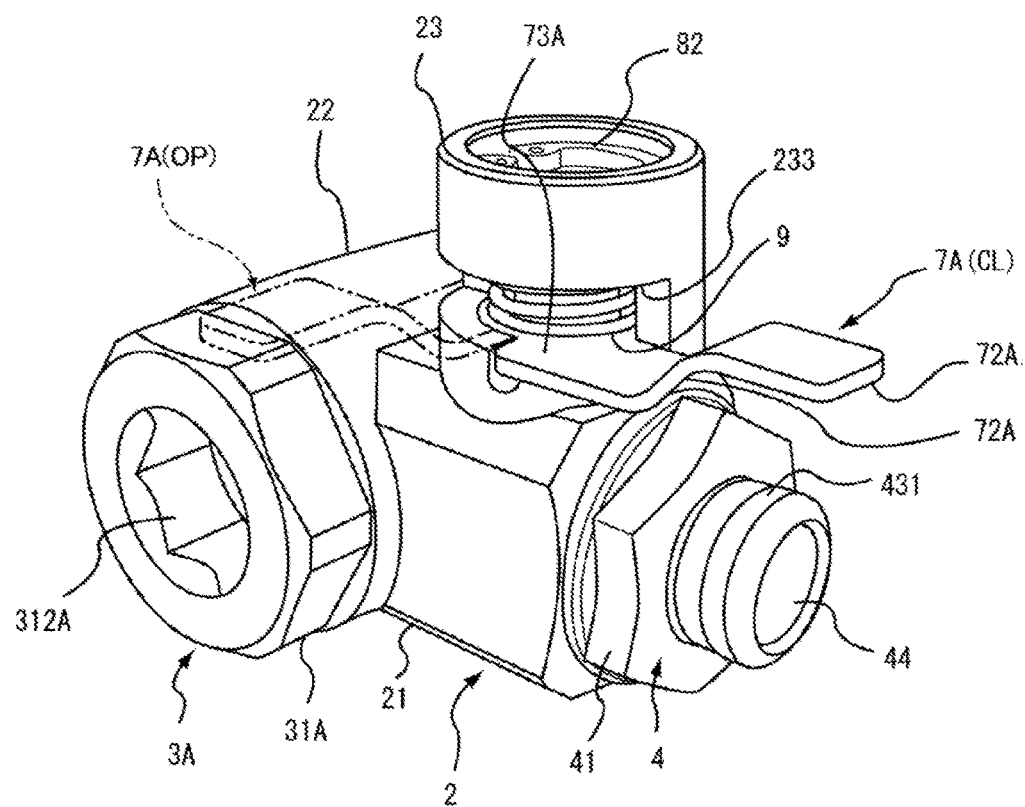
FIG. 12 is an overall perspective view showing another configuration example of the opening and closing valve of the present invention.
Figure 13:
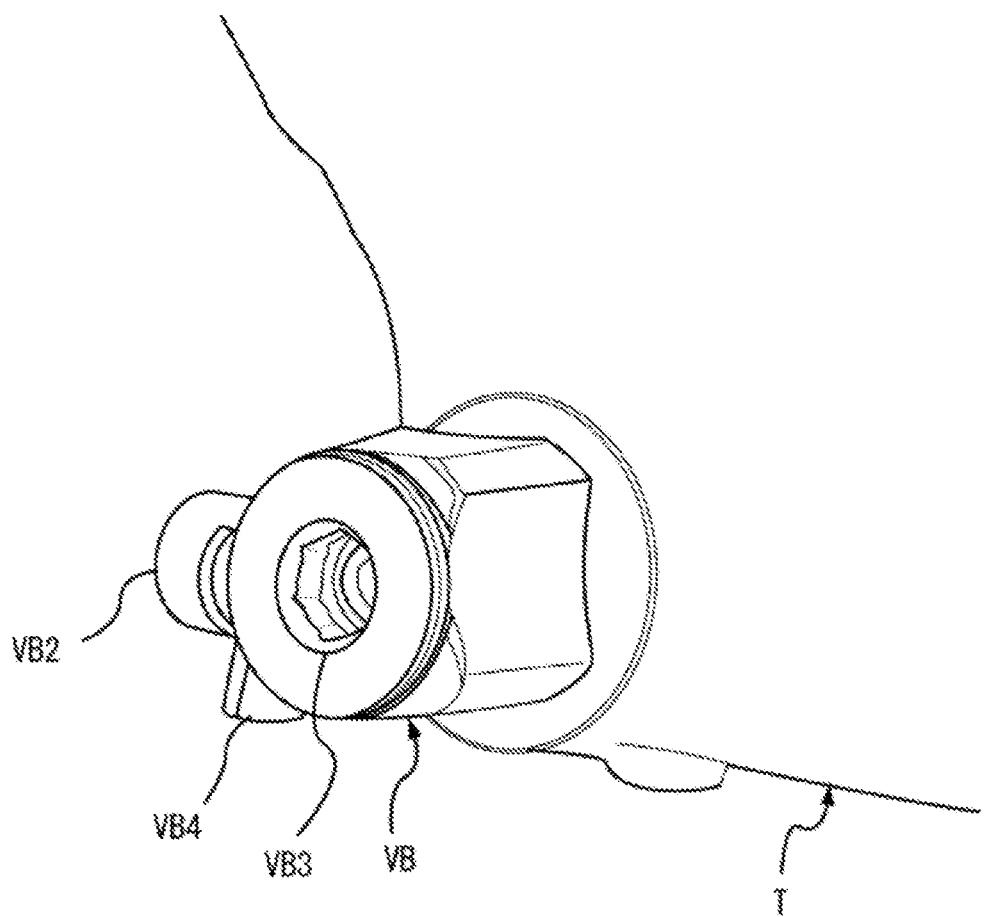
FIG. 13 is a perspective view showing an attachment orientation of a conventional opening and closing valve.
Figure 14:
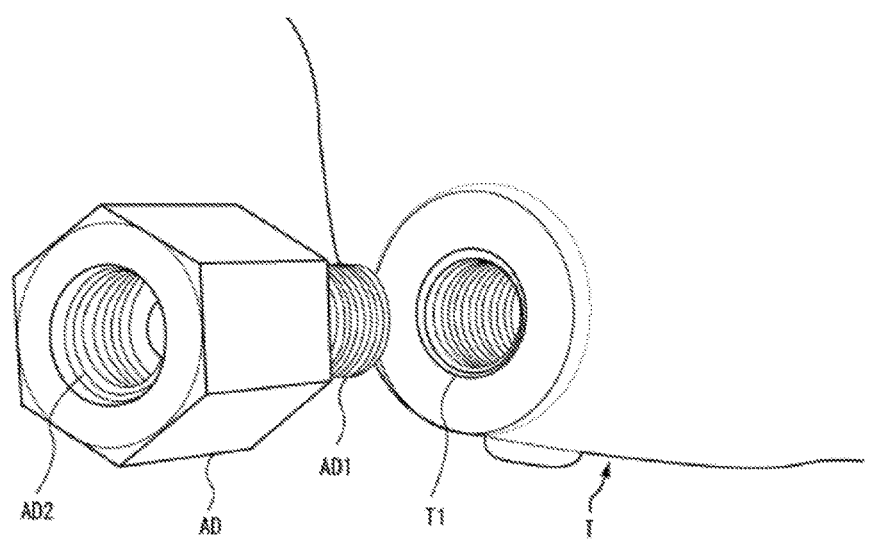
FIG. 14 is a perspective view showing a configuration of an adapter used with a conventional opening and closing valve.
Figure 15:
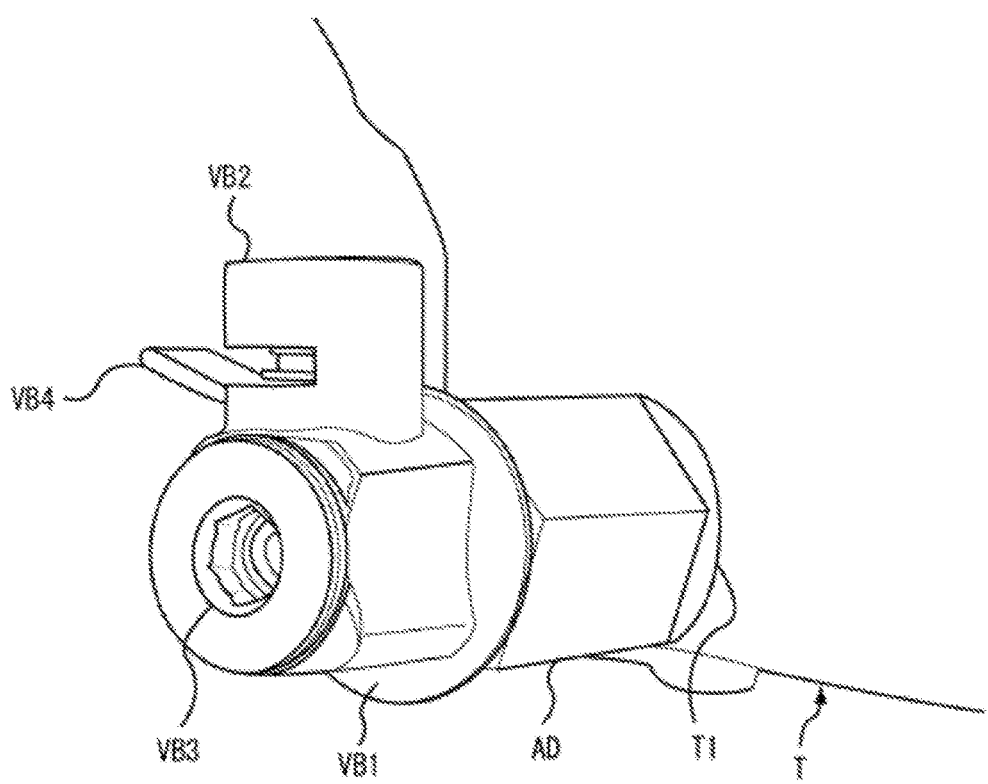
FIG. 15 is a perspective view showing the attachment orientation when an adapter is used with a conventional opening and closing valve

FIG. 11 and FIG. 12 are respectively a partial cross-sectional plan view and an overall perspective view showing another configuration example configured using the operation lever 7A shown in FIG. 9. As shown in FIG. 11, the fastening member 3A has a tip end discharge port connection part 33A, a fastening member body 32A, and a base end fastening part 31A. A male screw 331A, which screws together with a female screw formed on the inside of the container discharge port OPS, is formed on the outer circumference of the discharge port connection part 33A. The fastening member body 32A has the same outer diameter from the tip end discharge port connection part 33A to the base end fastening part 31A, and a large diameter part 335 is formed at the portion that connects with the fastening part 31A. The outer diameter of the base end part of the discharge port connection part 33A roughly matches the inner diameter of the small diameter part 221c of the housing unit 22. With the fastening member body 32, the outer diameter of the large diameter part 335 of the base end roughly matches the inner diameter of the large diameter part 221a of the housing unit 22, and the packing 362, which is a seal member, is interposed between the large diameter part 335 and the large diameter part 221a. The fastening part 31A has an outer diameter that is larger than the inner diameter of the large diameter part 221a of the housing unit 22, and a hexagon bolt head is configured. A hole 312A is formed at the center of the fastening part 31A. The hole 312A is formed in a polygon shape (a hexagon in the illustrated example), and by inserting a tool, a fastening operation can be also be performed with a tool other than the one inserted in the outer side of the bolt head. The configurations of a communicating path 34A and a communicating hole 341A of the fastening member 3A are the same as those for the fastening member 3, and thus descriptions thereof are omitted.

With the housing unit 22, a ring shaped accommodation groove 223 is formed in the outside of the small diameter part 221c at a position opposing the end face of the area surrounding the container discharge port OPS, and an O-ring 224, which is a seal member, is accommodated in the accommodation groove 223. Liquid leakage from the space between the housing unit 22 is suppressed by this O-ring at the container discharge port OPS.

The position of the operation lever 7A in the closed state is shown in FIG. 11 and FIG. 12. At the closed position, the operation lever 7A is located at a position (CL) at which a lever shaft line M2 becomes parallel with respect to a shaft line M1 of the valve body 2, and in the opened state, the operation lever 7A rotates to a position that is orthogonal with respect to the shaft line M1 (in FIG. 12, the position OP shown by the imaginary line).

Ordinarily, if the opening and closing valve 1 is attached to the container discharge port OPS, the opening and closing valve 1 is attached in the closed state, and therefore when the operation lever 7A is at the position parallel to the shaft line M1 in the closed state, if a wrench or other tool is attached to the fastening part 31A and a rotation operation is performed, the operation lever 7A does not interfere with the tool, and thus the operation is not hindered, which is an advantageous effect. Moreover, the opening and closing valve 1 of the present invention has a structure which enables rotation of the position of the valve main body 2 to an optional position with respect to the fastening member 3A, and therefore even if the fastening member 3A is loosened, and the direction of the valve main body 2 is changed, the operation lever 7A does not interfere with the tool, and the direction of the valve main body 2 can be easily changed.

Furthermore, as shown in FIG. 11, in the closed position, the shaft line M2 of the operation lever 7A becomes a position separated by a prescribed distance W with respect to the shaft line M1 of the valve main body 2. In other words, because the operation lever 7A does not overlap the discharge path 44, when the operation lever 7A is at the closed position (CL) and is rotated by hand, catching on the fingers by the discharge tube connected to the discharge path 44, the rotating connection member 45A, or the like is minimal, and operations are simplified.

As described above, in addition to being attached to an oil pan of a motorcycle and used, the opening and closing valve of the present invention can also be attached to an oil discharge port of an oil pan provided with another engine, is not limited to use with oil pans, and can also be attached to a discharge port of a another container for liquids and used.

What is claimed is:

1. An opening and closing valve comprising:
   a valve body housed in a valve storage unit within a main body, and capable of switching to an opened position and a closed position;
   an operating means for switching the valve body to the opened position or the closed position;
   a discharge path having one end communicating to a valve chamber of the main body, and another end communicating to a discharge port;
   a fastening member having at a leading end side a connecting part that screws onto a discharge port of a container; and
   a housing unit provided at the main body and penetrated by the fastening member in a freely rotatable manner; and
   a flow path having one end communicating to the valve chamber of the main body, and another end communicating to the housing unit;
   and at the opened position, flow between the discharge port and the flow path is enabled, and at the closed position, flow between the discharge port and the flow path is interrupted;
   wherein the fastening member comprises:
   a communicating path having one end communicating to inside the container and another end communicating to the flow path in a state that the fastening member is connected with the discharge port or the container; and
   a fastening part projecting to an outside of the housing unit and which is used to fasten the main body to the discharge port of the container from the outside of the housing unit;
   and the main body is fixed to the discharge port of the container with the housing unit in a liquid-sealed state by fastening the main body using the fastening member in a state that the fastening member is connected with the discharge port of the container.

2. The opening and closing valve according to claim 1, wherein a fitting hole for connecting a tool for implementing fastening work is formed at a center part in the fastening part of the fastening member.

3. The opening and closing valve according to claim 1, further comprising a discharge adapter having a base end connected to the discharge side of the discharge path, and a tip end connected to a discharge pipe.

4. An opening and closing valve comprising:
   a valve body housed in a valve storage unit within a main body, and capable of switching to an opened position and a closed position;
   an operating means for switching the valve body to the opened position or the closed position;
   a discharge path having one end communicating to a valve chamber of the main body, and another end communicating to a discharge port;
   a fastening member having at a leading end side a connecting part that screws onto the discharge port of a container;
   a housing unit provided at the main body and penetrated by the fastening member in a freely rotatable manner;
   and a flow path having one end communicating to the valve chamber of the main body, and another end communicating to the housing unit;
   and at the opened position, flow between the discharge port and the flow path is enabled, and at the closed position, flow between the discharge port and the flow path is interrupted;
   wherein the fastening member comprises:
   a communicating path having one end communicating to inside the container and another end communicating to the flow path in a state that the fastening member is connected with the discharge port of the container;
   a fastening part projecting to an outside of the housing unit and which is used to fasten the main body to the discharge port of the container from the outside of the housing unit; and
   a pair of packings arranged sandwiching the flow path between an outer peripheral surface of the fastening member positioned inside the housing unit and an inner wall of the housing unit.

5. The opening and closing valve according to claim 4, wherein a fitting hole for connecting a tool for implementing fastening work is formed at a center part in the fastening part of the fastening member.

6. The opening and closing valve according to claim 4, further comprising a discharge adapter having a base end connected to the discharge side of the discharge path, and a tip end connected to a discharge pipe.

* * * * *